United States Patent
Chowdhury et al.

(10) Patent No.: US 12,463,562 B2
(45) Date of Patent: Nov. 4, 2025

(54) SYSTEM AND METHOD FOR MANAGING ELECTROSTATIC ADHESION BETWEEN A SHEET OF MATERIAL AND AN ELECTROSTATIC PAD

(71) Applicant: The Boeing Company, Arlington, VA (US)

(72) Inventors: Nayeem Chowdhury, Melbourne (AU); William Ko, Melbourne (AU)

(73) Assignee: The Boeing Company, Arlington, VA (US)

(*) Notice: Subject to any disclaimer, the term of this patent is extended or adjusted under 35 U.S.C. 154(b) by 204 days.

(21) Appl. No.: 18/489,464

(22) Filed: Oct. 18, 2023

(65) Prior Publication Data

US 2025/0132697 A1    Apr. 24, 2025

(51) Int. Cl.
*H02N 13/00* (2006.01)

(52) U.S. Cl.
CPC .................... *H02N 13/00* (2013.01)

(58) Field of Classification Search
CPC ............................ H02N 13/00; B25J 15/0085
USPC ........................................................ 361/234
See application file for complete search history.

(56) References Cited

U.S. PATENT DOCUMENTS

| | | | |
|---|---|---|---|
| 4,976,012 A | 12/1990 | McConnell | |
| 5,151,277 A | 9/1992 | Bernardon et al. | |
| 5,670,066 A * | 9/1997 | Barnes | H03K 17/955 269/903 |
| 6,053,026 A | 4/2000 | Nardiello et al. | |
| 6,830,712 B1 | 12/2004 | Roffman et al. | |
| 7,558,045 B1 * | 7/2009 | Onate | H01L 21/67259 361/234 |
| 8,564,926 B2 * | 10/2013 | Prahlad | B25J 15/0085 361/234 |
| 9,561,602 B2 | 2/2017 | Jones et al. | |
| 9,969,131 B2 | 5/2018 | Samak Sangari et al. | |

(Continued)

FOREIGN PATENT DOCUMENTS

| | | |
|---|---|---|
| GB | 2467784 A | 8/2010 |
| JP | S58100696 A | 6/1983 |
| WO | 2020178387 A1 | 9/2020 |

OTHER PUBLICATIONS

Adapa A/S, Adaptive Moulds, "Double Curved Adaptive Moulds", User Manual, May 2021, pp. 1-24, Denmark.

(Continued)

*Primary Examiner* — Kevin J Comber
(74) *Attorney, Agent, or Firm* — Kunzler Bean & Adamson

(57) ABSTRACT

A method and system for managing adhesion between a sheet of material and an electrostatic pad. The method includes applying a voltage across the electrostatic pad to establish a baseline voltage level thereacross and to generate an electrostatic potential across the electrostatic pad, bringing the electrostatic pad near or into contact with the sheet so that the sheet electrostatically adheres to the electrostatic pad, and monitoring a capacitance between the sheet and the electrostatic pad. If a drop in the capacitance occurs that is below a predetermined capacitance limit, then the voltage is increased to an elevated voltage level so as to increase the electrostatic adhesion between the electrostatic pad and the sheet. The system includes a voltage module, a monitoring module and a control module.

30 Claims, 5 Drawing Sheets

(56) References Cited

U.S. PATENT DOCUMENTS

| | | |
|---|---|---|
| 10,538,451 B2 | 1/2020 | Angel et al. |
| 2003/0205334 A1 | 11/2003 | Sherrill et al. |
| 2008/0251975 A1 | 10/2008 | Gallagher et al. |
| 2010/0043511 A1 | 2/2010 | Forsyth |
| 2020/0331214 A1 | 10/2020 | Vlavianos et al. |
| 2020/0398459 A1 | 12/2020 | Lehmann Madsen et al. |
| 2023/0286229 A1 | 9/2023 | Chowdhury |

OTHER PUBLICATIONS

Terekhov, I.V. et al., "Binders Used for Manufacturing of Composite Materials by Liquid Composite Molding", Polymers Journal, 2022, pp. 1-30, vol. 14, No. 87, MDPI, Switzerland.

Innovative Sensor Technology AG, "Micro Heaters", Switzerland, retrieved from https://www.ist-ag.com/en/micro-heaters.

Intellectual Property Office of the United Kingdom Combined Searcha and Examination Report, dated Aug. 7, 2023, regarding Application No. GB2302685.2, 8 pages.

Extended European Search Report for EP Patent Application No. 24202220.0 dated Apr. 28, 2025.

\* cited by examiner

SYSTEM AND METHOD FOR MANAGING ELECTROSTATIC ADHESION BETWEEN A SHEET OF MATERIAL AND AN ELECTROSTATIC PAD

INTRODUCTION

This disclosure relates to managing electrostatic adhesion between a sheet of material and an electrostatic pad.

In certain manufacturing or fabrication environments, carbon fiber sheets may be used to fabricate parts, such as in resin infusion processes. These carbon sheets may be picked up from a material supply stack or station and moved to another station, such as a trimming station, an infusion station or the like.

Various approaches may be used to move these carbon sheets from one station to another. One such approach is to use an electrostatic pad, or an array of such pads, carried on the end of an end effector. A voltage may be applied across the pads to create an electrostatic adhesion potential across the pads, and the pads may then be moved to a position near or in contact with a carbon sheet. With the pad positioned near or in contact with the sheet, the electrostatic adhesion potential may be used to attract and electrostatically adhere the sheet to the pad.

SUMMARY

According to one embodiment, a method for managing electrostatic adhesion between a sheet of material and an electrostatic pad includes: applying a voltage across the electrostatic pad to establish a baseline voltage level thereacross and to generate an electrostatic potential across the electrostatic pad; bringing the electrostatic pad near or into contact with the sheet so that the sheet electrostatically adheres to the electrostatic pad; and monitoring a capacitance between the sheet and the electrostatic pad.

The method may also include lifting the electrostatic pad, thereby also lifting the sheet which is electrostatically adhered thereto, and if a drop in the capacitance occurs that is below a predetermined capacitance limit, then increasing the voltage to an elevated voltage level so as to increase the electrostatic adhesion between the electrostatic pad and the sheet.

In this embodiment, the drop in the capacitance below the predetermined capacitance limit may be indicative of a loss of electrostatic adhesion between the sheet and the electrostatic pad. Here, the increasing the voltage may restore at least some of the loss of electrostatic adhesion between the sheet and the electrostatic pad. The increasing the voltage may restore the capacitance to at or above the predetermined capacitance limit, and the loss may be less than a full loss of electrostatic adhesion between the sheet and the electrostatic pad.

The method may also include continuing to monitor the capacitance between the sheet and the electrostatic pad, and if the capacitance rises to at or above the predetermined capacitance limit, then decreasing the voltage to the baseline voltage level. Here, the elevated voltage level may be approximately double the baseline voltage level.

The sheet may electrostatically adhere to the electrostatic pad due to the electrostatic adhesion generated by the electrostatic potential. The sheet of material may have a fiber core made of at least one of carbon, polymer, glass, metal and ceramic, and the capacitance between the sheet and the electrostatic pad may be inferred from a power curve associated with applying the voltage to the electrostatic pad.

The method may further include monitoring a power curve associated with the increasing the voltage when the capacitance is below the predetermined capacitance limit, and inferring the capacitance between the sheet and the electrostatic pad from the power curve. The voltage applied to the electrostatic pad may be applied as an AC square wave having a rise time, and the capacitance between the sheet and the electrostatic pad may be inferred from the rise time.

According to another embodiment, a method for controlling electrostatic adhesion between a sheet of material and an electrostatic pad includes: placing the electrostatic pad near or in contact with the sheet so that the sheet electrostatically adheres to the electrostatic pad, and monitoring a capacitance between the sheet and the electrostatic pad.

The method may also include applying a voltage across the electrostatic pad to establish a baseline voltage level thereacross, and generating an electrostatic potential across the electrostatic pad as a result of the voltage applied across the electrostatic pad. The method may additionally include moving the electrostatic pad, and thereby moving the sheet that is electrostatically adhered to the electrostatic pad, and may further include increasing the voltage to an elevated voltage level if the capacitance drops below a predetermined capacitance limit.

In this embodiment, the drop in the capacitance below the predetermined capacitance limit may be indicative of a loss of electrostatic adhesion between the sheet and the electrostatic pad which is less than a full loss of electrostatic adhesion between the sheet and the electrostatic pad, and the increasing the voltage may restore at least some of the loss of electrostatic adhesion between the sheet and the electrostatic pad. The sheet of material may have a fiber core made of at least one of carbon, polymer, glass, metal and ceramic, and the sheet may electrostatically adhere to the electrostatic pad due to the electrostatic adhesion generated by the electrostatic potential.

The method may also include: continuing to monitor the capacitance between the sheet and the electrostatic pad; and, if the capacitance rises to at or above the predetermined capacitance limit, then decreasing the voltage to the baseline voltage level. The method may further include: monitoring a power curve associated with the increasing the voltage when the capacitance is below the predetermined capacitance limit; and inferring the capacitance between the sheet and the electrostatic pad from the power curve. The voltage applied to the electrostatic pad may be applied as an AC square wave having a rise time, and the capacitance between the sheet and the electrostatic pad may be inferred from the rise time.

According to yet another embodiment, a system for managing electrostatic adhesion between a sheet of material and an electrostatic pad includes: (i) a voltage module configured for applying a voltage across the electrostatic pad, to thereby establish a baseline voltage level thereacross and to generate an electrostatic potential across the electrostatic pad; (ii) a monitoring module configured for monitoring a capacitance between the sheet and the electrostatic pad; and (iii) a control module operatively connected with at least the voltage module and the monitoring module.

The sheet of material may have a fiber core made of at least one of carbon, polymer, glass, metal and ceramic, and the system may also include a moving module configured for moving the electrostatic pad to a first position near the sheet and to one or more other positions away from the first position. If the capacitance drops below a predetermined capacitance limit, then at least one of the monitoring module and the control module may cause the voltage module to increase the voltage to an elevated voltage level so as to increase the electrostatic adhesion between the electrostatic pad and the sheet.

The monitoring module may be configured to continue monitoring the capacitance between the sheet and the electrostatic pad after the voltage has been increased to the elevated voltage level, and at least one of the monitoring module and the control module may be configured to cause the voltage module to decrease the voltage to the baseline voltage level if the capacitance rises to at or above the predetermined capacitance limit.

In this system, at least one of the monitoring module and the control module may be configured to monitor a power curve associated with the increase in voltage when the capacitance is below the predetermined capacitance limit, and to infer the capacitance between the sheet and the electrostatic pad from the power curve. Additionally, the voltage module may be configured to apply the voltage to the electrostatic pad as an AC square wave having a rise time, wherein at least one of the monitoring module and the control module is configured to infer the capacitance between the sheet and the electrostatic pad from the rise time.

According to a further embodiment, a method for controlling electrostatic adhesion between a sheet of material and an electrostatic pad includes: (i) detecting a loss of electrostatic adhesion between the sheet and the electrostatic pad; (ii) increasing a voltage across the electrostatic pad; and (iii) restoring at least some of the loss of electrostatic adhesion between the sheet and the electrostatic pad. The method may further include: (iv) reducing the voltage across the electrostatic pad when at least some of the loss of electrostatic adhesion is restored.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
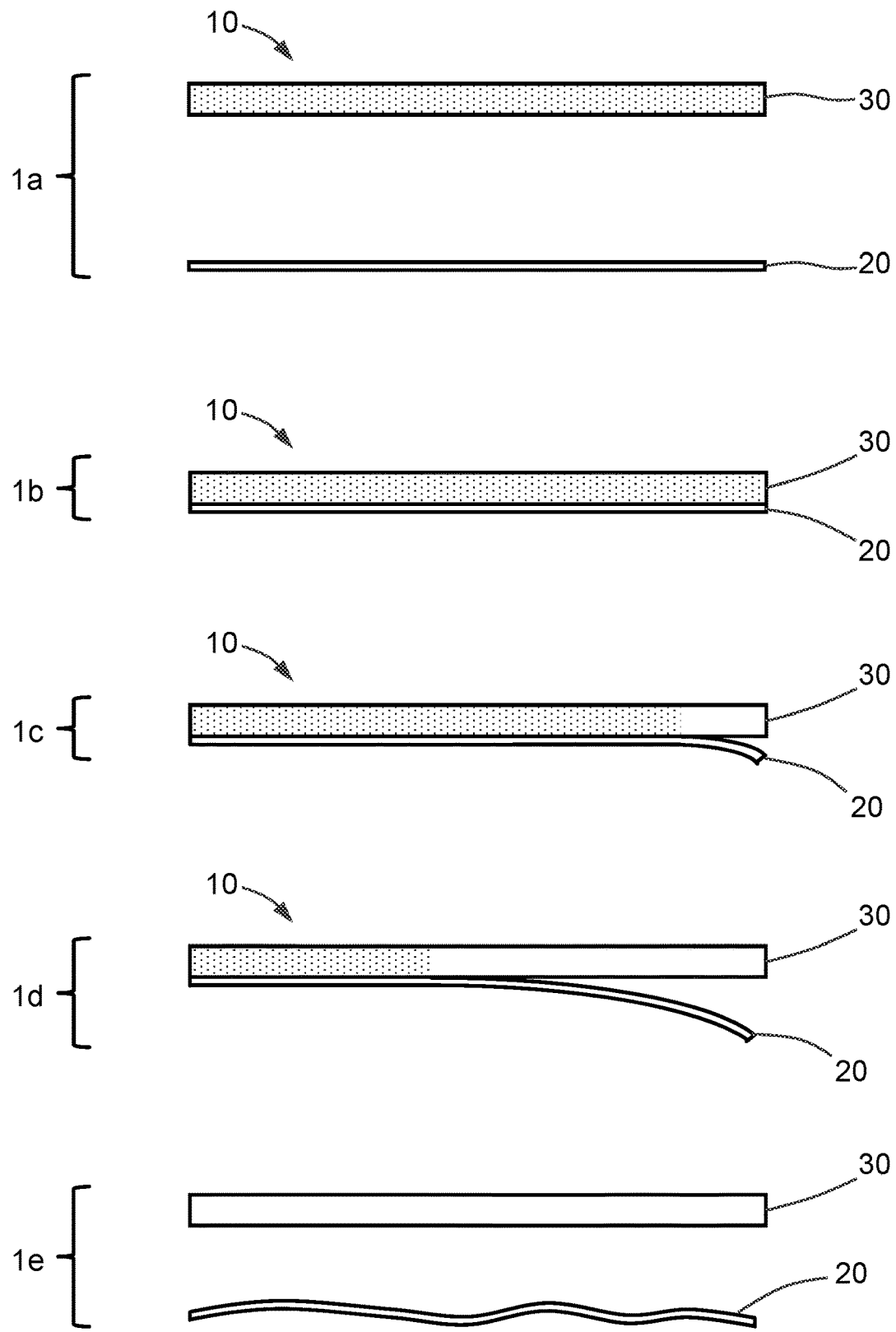
FIG. 1 is a series of schematic side views representing a sequence of steps for picking up a sheet of material with an electrostatic pad, and illustrating a loss of electrostatic adhesion therebetween.

Referring now to the drawings, wherein like numerals indicate like parts in the several views, a method 100 and system 300 for managing and/or controlling electrostatic adhesion 10 between a sheet 20 of material 21 and an electrostatic pad 30 are shown and described herein.

FIG. 1 shows a series of schematic side views representing a sequence of steps for picking up a sheet 20 of material 21 with an electrostatic pad 30, and illustrating a loss 14 of electrostatic adhesion 10 therebetween, according to a conventional approach. Note that in FIG. 1 (and also in FIG. 2, as discussed below), the electrostatic pad 30 is shown in each step with a particular amount of cross-hatching. For example, in steps 1a and 1b, the cross-hatching extends across the entire electrostatic pad 30, but the cross-hatching is reduced in step 1c, and even further reduced in step 1d, until the cross-hatching is completely gone in step 1e. This cross-hatching represents regions across the electrostatic pad 30 where the actual or potential electrostatic adhesion 10 between the electrostatic pad 30 and the sheet 20 is strong enough to maintain the sheet 20 in contact with the electrostatic pad 30. Note that while the drawings show regions of the electrostatic pad 30 being either fully cross-hatched (signifying sufficient electrostatic adhesion 10 at those regions) or not cross-hatched at all (signifying insufficient electrostatic adhesion 10 at those regions), this is merely for purposes of simplicity and illustration, as in reality the degree of electrostatic adhesion 10 spans across a continuous spectrum between fully sufficient and fully insufficient electrostatic adhesion 10.

At step 1a, an electrostatic pad 30 is positioned above a sheet 20 that is to be lifted and moved. Note here that the electrostatic adhesion 10 (i.e., cross-hatching) extends across the entire electrostatic pad 30. This potential for electrostatic adhesion 10 (i.e., electrostatic potential) is achieved by applying an appropriate voltage or voltage difference across the electrostatic pad 30.

At step 1b, the electrostatic pad 30 and sheet 20 are brought together in contact with one another. This may be achieved by lifting the sheet 20 and/or by lowering the electrostatic pad 30. Note here that the electrostatic adhesion 10 (i.e., cross-hatching) still extends across the entire electrostatic pad 30.

At step 1c, it can be seen that the right edge of the sheet 20 has begun to peel away from the underside surface of the electrostatic pad 30. Such a peeling away of the sheet 20 can be caused for various reasons, such as the electrostatic pad 30 bumping into or brushing against an external object, which causes the sheet 20 to be locally dislodged from the electrostatic pad 30. Note that at step 1c, no cross-hatching is shown in the region of the electrostatic pad 30 where the sheet 20 has been peeled away, indicating that the electrostatic adhesion 10 in this region has been compromised or weakened. In such cases where the electrostatic adhesion 10 has been locally weakened, it is often the case that the degradation of electrostatic adhesion 10 may continue to spread to neighboring regions of the electrostatic pad 30, causing even further separation between the sheet 20 and the electrostatic pad 30.

At step 1d, the sheet 20 has continued to separate from the electrostatic pad 30, and the cross-hatching (i.e., electrostatic adhesion 10) is shown to cover an even smaller area than before. It may be noted that as more and more portions of the sheet 20 become separated from the electrostatic pad 30, the weight of such separated portions adds even more impetus toward the separation continuing, in what may be viewed as a continued "domino effect" of separation.

At step 1e, the sagging weight of the separated portions of the sheet 20 has eventually become too great for the remaining electrostatic adhesion 10 to overcome, until the sheet 20 completely separates from the electrostatic pad 30.

In contrast with the abovementioned customary approach, a method 100 and system 300 are disclosed herein which solve the technical problem of losing electrostatic adhesion 10 between an electrostatic pad 30 and a sheet 20 of material 21, such as during a pick-and-place operation. This is accomplished by the technical effect of monitoring the capacitance 50 between the electrostatic pad 30 and the sheet 20, and then maintaining the capacitance 50 when it drops 52 below 54 a predetermined capacitance limit 55 by applying an increased voltage across the electrostatic pad 30, thereby providing significant benefits and technical advantages which are not taught or suggested by conventional approaches. These benefits and technical advantages include improved throughput, less waste, less cost and higher reliability as compared to previous approaches.

Figure 2:
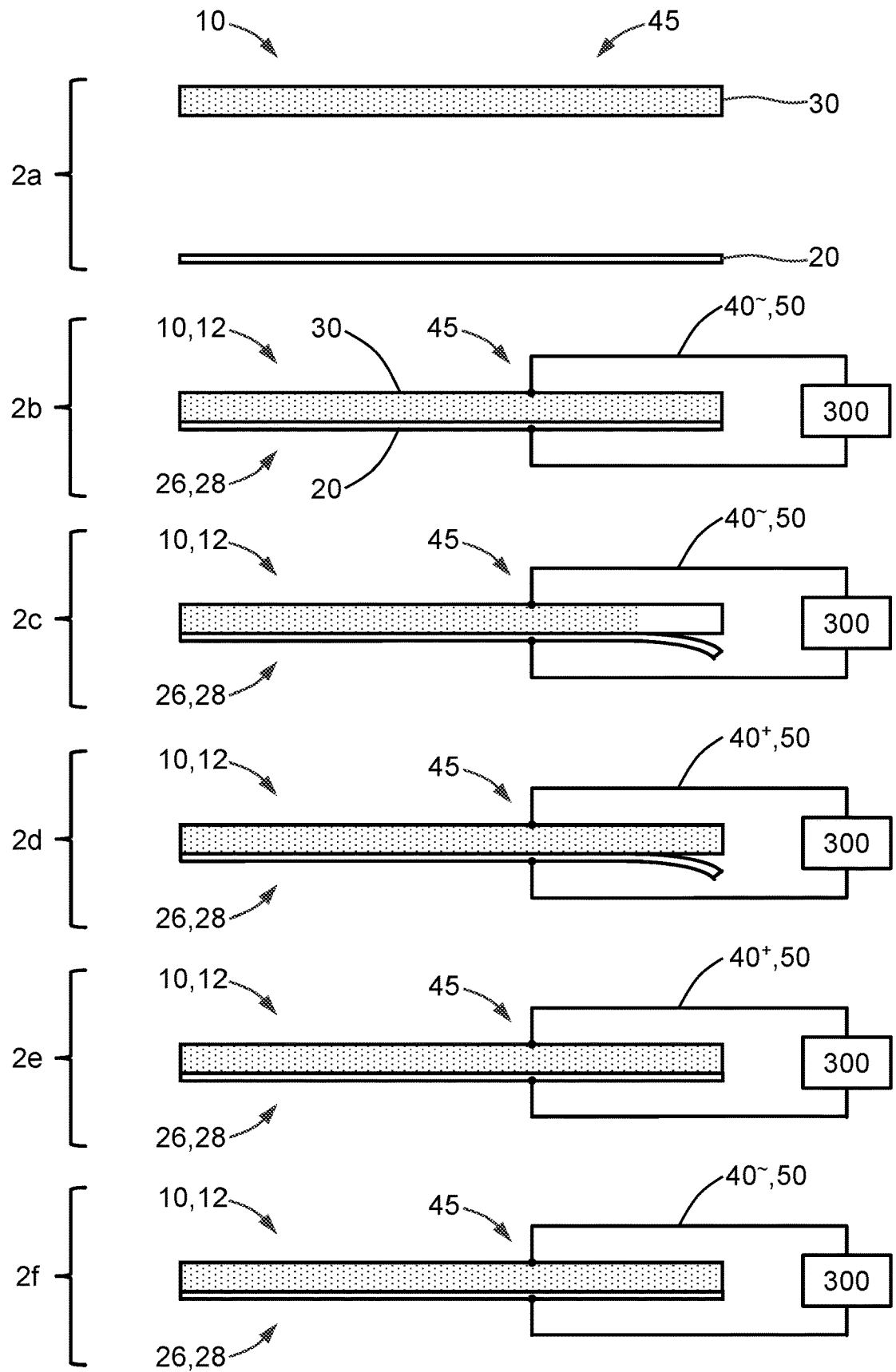
FIG. 2 is a series of schematic side views representing a sequence of steps for picking up a sheet of material with an electrostatic pad, and avoiding a loss of electrostatic adhesion therebetween according to the present disclosure.

FIG. 2 shows a sequence of steps for picking up a sheet 20 of material 21 with an electrostatic pad 30, and avoiding or mitigating a loss 14 of electrostatic adhesion 10 therebetween, according to the method 100 of the present disclosure.

At step 2a (similar to step 1a), an electrostatic pad 30 is positioned above a sheet 20 that is to be lifted and moved. Note here that the electrostatic adhesion 10 (i.e., cross-hatching) extends across the entire electrostatic pad 30. This electrostatic adhesion 10 is generated by a voltage being applied across the electrostatic pad 30, thereby generating an electrostatic potential 45 across the electrostatic pad 30.

At step 2b, the electrostatic pad 30 and sheet 20 are brought together in contact 28 with one another, and the capacitance 50 across the electrostatic pad 30 and sheet 20 is measured and monitored. A suitable system 300 (described in detail below) is used to apply a voltage 40 across the electrostatic pad 30, so as to establish a baseline voltage level 40⁻ thereacross, and to monitor a capacitance 50 across the electrostatic pad 30 and the sheet 20. The sheet 20 electrostatically adheres 12 to the electrostatic pad 30 when the electrostatic pad 30 is brought near 26 or into contact 28 with the sheet 20 due to the electrostatic adhesion 10 generated by the electrostatic potential 45.

At step 2c, the right edge of the sheet 20 has become dislodged, such as from an external impact or perturbance, with a diminishment of the electrostatic adhesion 10 at the impacted area shown by the lack of cross-hatching thereat. The system 300 detects this diminishment as a drop 52 in the monitored capacitance 50.

At step 2d, the system 300 increases the voltage 40 to an increased or elevated voltage 40⁺, in response to detecting the drop 52 in monitored capacitance 50. This increase in voltage 40 then causes an increase in the electrostatic adhesion 10, as indicated by the cross-hatching which now extends across the entire electrostatic pad 30 and even into the area of the electrostatic pad 30 which previously suffered from insufficient electrostatic adhesion 10 (i.e., the non-cross-hatched area shown in step 2c).

At step 2e, it can be seen that the increased electrostatic adhesion 10, caused by the increase in applied voltage 40, has been strong enough to cause the previously separated portion of the sheet 20 to be electrostatically attracted back into contact 28 with the electrostatic pad 30.

At step 2f, with the sheet 20 now fully in contact 28 once again with the electrostatic pad 30, the system 300 detects an increase in capacitance 50 between the sheet 20 and the electrostatic pad 30. Once the capacitance 50 has been restored back to a predetermined level (e.g., to the previous capacitance 50 of step 2b), the system 300 then decreases the voltage 40 back to the baseline voltage level 40⁻.

Figure 3:
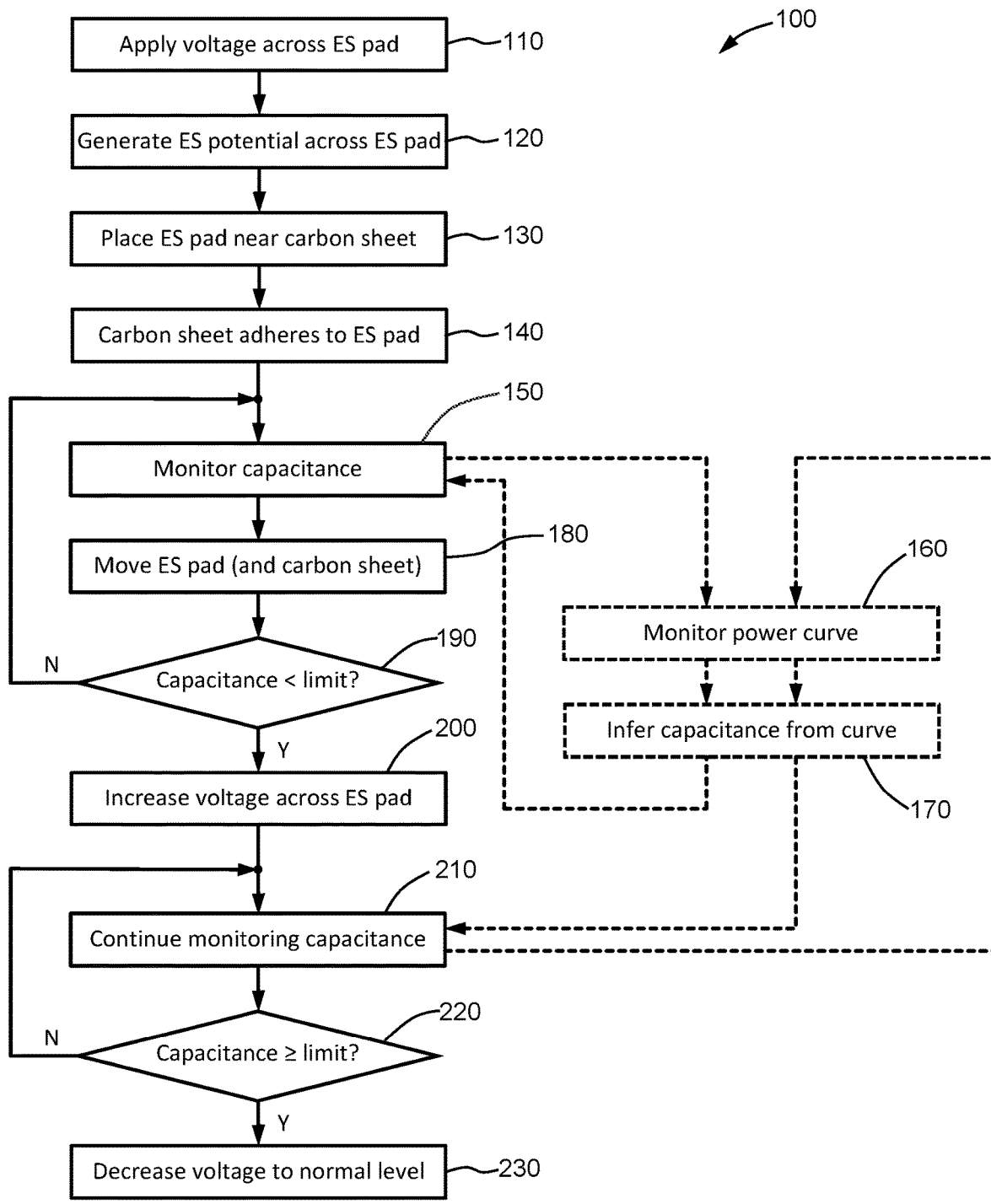
FIG. 3 is a flowchart of steps for a method of managing electrostatic adhesion between a sheet of material and an electrostatic pad.

FIG. 3 shows a flowchart for the method 100 described above. At block 110, a voltage 40 is applied across the electrostatic pad 30 to establish a baseline voltage level 40⁻ thereacross, and at block 120, an electrostatic potential 45 is generated across the electrostatic pad 30 due to the applied voltage 40. (Note that here in FIG. 3, as well as in FIGS. 5-6, the abbreviation "ES" is used for "electrostatic.") At block 130, the electrostatic pad 30 is brought near 26 or into contact 28 with the sheet 20 (by the lifting of the sheet 20 and/or by the lowering of the electrostatic pad 30) so that, at block 140, the sheet 20 electrostatically adheres 12 to the electrostatic pad 30. At block 150, the capacitance 50 between the sheet 20 and the electrostatic pad 30 is monitored, such as by the abovementioned system 300. At block 180, the electrostatic pad 30 is lifted or moved, thereby also lifting or moving the sheet 20 which is electrostatically adhered 12 to the electrostatic pad 30. (In other words, the sheet 20 is picked up by the electrostatic pad 30 using the generated electrostatic potential 45.) And at block 190, the capacitance 50 is checked to determine if it has dropped below 54 a predetermined capacitance limit 55; if it has, then at block 200, the voltage 40 is increased to an elevated voltage level 40⁺ so as to increase the electrostatic adhesion 10 between the electrostatic pad 30 and the sheet 20.

As noted above, a drop 52 in capacitance 50 below the predetermined capacitance limit 55 may be indicative of a loss 14 of electrostatic adhesion 10 between the sheet 20 and the electrostatic pad 30. This loss 14 may be less than a full loss 16 of electrostatic adhesion 10 where the sheet 20 becomes completely separated from the electrostatic pad 30; that is, the loss 14 may be a partial loss, in which only a portion of the sheet 20 becomes separated from the electrostatic pad 30. The increase in voltage 40 from the baseline voltage level 40⁻ to the elevated voltage level 40⁺ urges the sheet 20 to overcome the loss 14 of electrostatic adhesion 10 between the sheet 20 and the electrostatic pad 30 by restoring at least some 18 of this loss 14 of electrostatic adhesion 10.

The method 100 may also include: at block 210, continuing to monitor the capacitance 50 between the sheet 20 and the electrostatic pad 30, and, at block 220, if the capacitance 50 rises to at 56 or above 58 the predetermined capacitance limit 55, then, at block 230, decreasing the voltage 40 to the baseline voltage level 40⁻. Here, the elevated voltage level 40⁺ may be approximately double 42 the baseline voltage level 40⁻.

Figure 4:
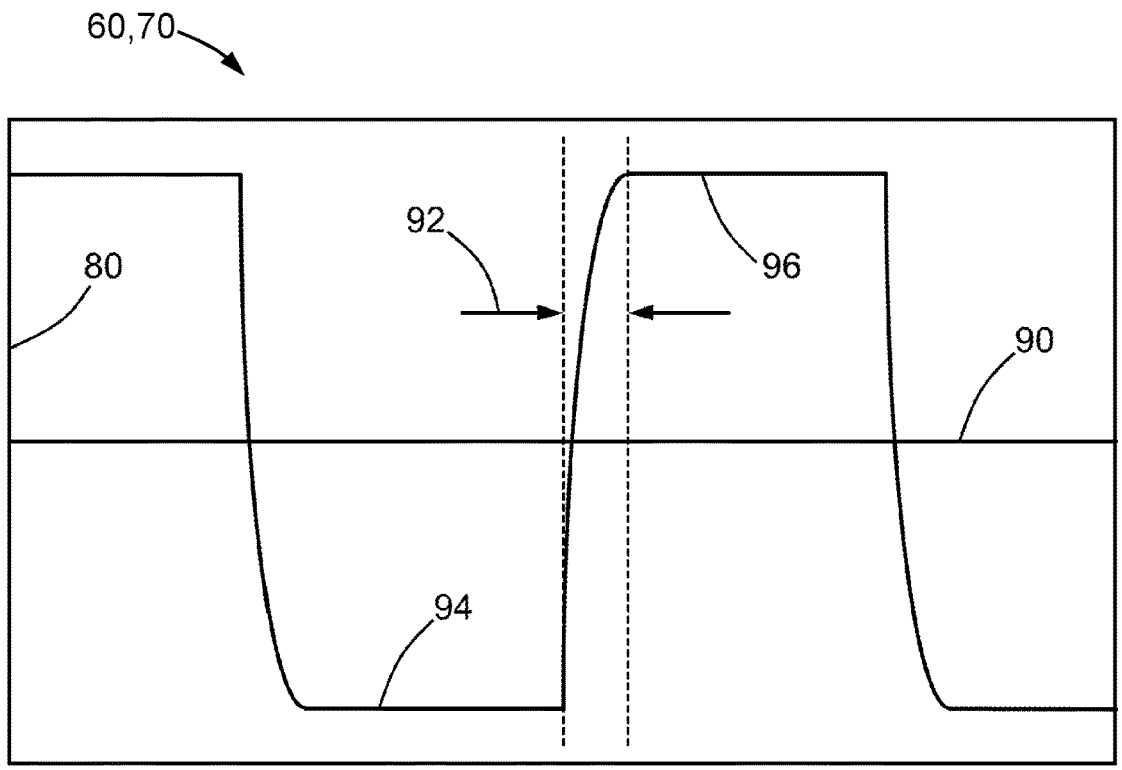
FIG. 4 is a plot of amplitude versus time for an AC square wave power curve.

FIG. 4 shows a plot of amplitude versus time for a power curve 60 of the applied voltage 40, which may take the form of an AC square wave 70. The vertical axis 80 measures the amplitude of the power curve 60, while the horizontal axis 90 measures time (e.g., in milliseconds). In the case of the power curve 60 being an AC square wave 70, the power curve 60 has a rise time 92 from a minimum level 94 to a maximum level 96. The rise time 92 may be the time it takes to reach 100% of the distance from the minimum level 94 to the maximum level 96, or it may be the time it takes to traverse some portion of this distance (e.g., from the minimum level 94 to 90% of the distance to the maximum level 96, or from 10% to 90% of the minimum level-to-maximum level distance). The capacitance 50 between the sheet 20 and the electrostatic pad 30 may be inferred from the power curve 60; specifically, the capacitance 50 may be inferred from the rise time 92.

Thus, the method 100 may further include, at block 160, monitoring the power curve 60 associated with the increase in voltage 40 when the capacitance 50 is below the predetermined capacitance limit 55, and, at block 170, inferring the capacitance 50 between the sheet 20 and the electrostatic pad 30 from the power curve 60. As mentioned above, the voltage 40 applied to the electrostatic pad 30 may be applied as an AC square wave 70 having a rise time 92, and the capacitance 50 between the sheet 20 and the electrostatic pad 30 may be inferred from the rise time 92. Thus, as noted in FIG. 3, the step of monitoring the capacitance 50 at block 150 may include the steps of monitoring the power curve 60 at block 160 and inferring the capacitance from the power curve 60 (e.g., from the rise time 92) at block 170.

It may be noted that the process flow from block 150 to blocks 160 and 170 and back to block 150, as well as the outlines of blocks 160 and 170 themselves, are shown as dashed lines. This is to indicate that the steps represented by blocks 160 and 170 are optional steps. That is, the step of measuring and/or monitoring capacitance 50 at block 150 may be performed by other approaches than the steps of blocks 160 and 170.

Figure 5:
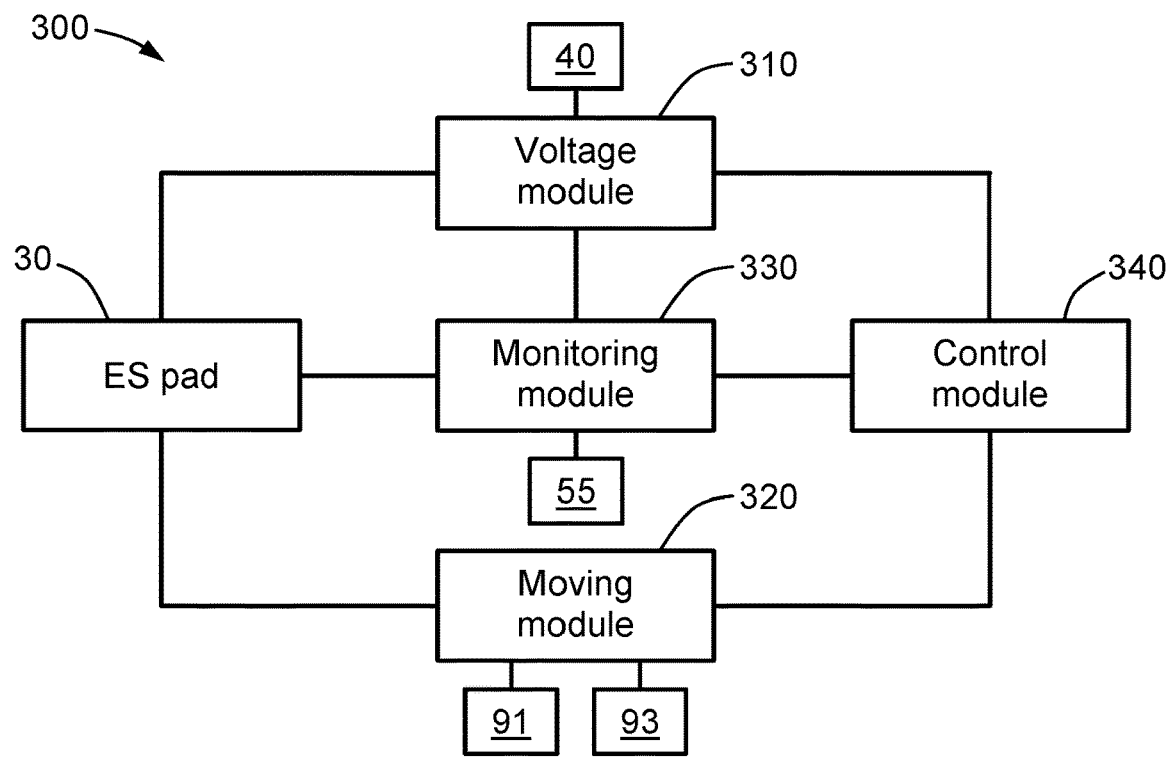
FIG. 5 is a block diagram of a system for managing electrostatic adhesion between a sheet of material and an electrostatic pad.

FIG. 5 shows a block diagram of the system 300 for monitoring and maintaining electrostatic adhesion 10 between a sheet 20 and an electrostatic pad 30. The system 300 includes a voltage module 310, an optional moving module 320, a monitoring module 330 and a control module 340.

The voltage module 310 is configured for applying a voltage 40 across the electrostatic pad 30, so as to generate a baseline voltage level 40⁻ and an electrostatic potential 45 across the electrostatic pad 30. For example, the voltage module 310 may include an alternating current (AC) or direct current (DC) power source, and suitable leads, cables or connections for providing the voltage 40 to the electrostatic pad 30. The voltage module 310 is also configured to have the capability of increasing the voltage 40 to an elevated voltage level 40⁺, and for decreasing the voltage 40 back to the baseline voltage level 40⁻, as commanded by the monitoring module 330 and/or the control module 340.

The moving module 320 is configured for moving the electrostatic pad 30 to a first position 91 near 26 the sheet 20 and to one or more other positions 93 that are away from the first position. For example, the first position 91 may be a placement of the electrostatic pad 30 very near 26 to or in direct contact 28 with the sheet 20, so that the sheet 20 is electrostatically attracted and adhered to the electrostatic pad 30. The one or more other positions 93 may be locations within a manufacturing or fabrication environment where the sheet 20 is to be placed after being picked up by the electrostatic pad 30.

The monitoring module 330 is configured for monitoring a capacitance 50 between the sheet 20 and the electrostatic pad 30. For example, the monitoring module 330 may include a multimeter with an internal discharge capacitor, or a multimeter used in conjunction with an external discharge capacitor. Alternatively, the monitoring module 330 may monitor the capacitance 50 by referencing a power curve 60, such as an AC square wave 70, and inferring the capacitance 50 from the rise time 92 of the power curve 60 or AC square wave 70.

The control module 340 is operatively connected with at least the voltage module 310 and the monitoring module 330. If the monitored capacitance 50 drops below a predetermined capacitance limit 55, then at least one of the monitoring module 330 and the control module 340 causes the voltage module 310 to increase the voltage 40 to an elevated voltage level 40⁺ so as to increase the electrostatic adhesion 10 between the electrostatic pad 30 and the sheet 20.

Note that two or more of these modules may be combined with one another. For example, the voltage module 310 and the monitoring module 330 may be combined with each other. As another example, the voltage module 310, the monitoring module 330 and the control module 340 may be combined with each other. Various other combinations are possible as well.

The monitoring module 330 may be configured to continue monitoring the capacitance 50 between the sheet 20 and the electrostatic pad 30 after the voltage 40 has been increased, and at least one of the monitoring module 330 and the control module 340 is configured to cause the voltage module 310 to decrease the voltage 40 to the baseline voltage level 40⁻ if the capacitance 50 rises to at 56 or above 58 the predetermined capacitance limit 55.

In this system 300, at least one of the monitoring module 330 and the control module 340 may be configured to monitor a power curve 60 associated with the increase in voltage 40 when the capacitance 50 is below the predetermined capacitance limit 55, and to infer the capacitance 50 between the sheet 20 and the electrostatic pad 30 from the power curve 60. As noted above, the voltage module 310 may be configured to apply the voltage 40 to the electrostatic pad 30 as an AC square wave 70 having a rise time 92, wherein at least one of the monitoring module 330 and the control module 340 is configured to infer the capacitance 50 between the sheet 20 and the electrostatic pad 30 from the rise time 92.

Figure 6:
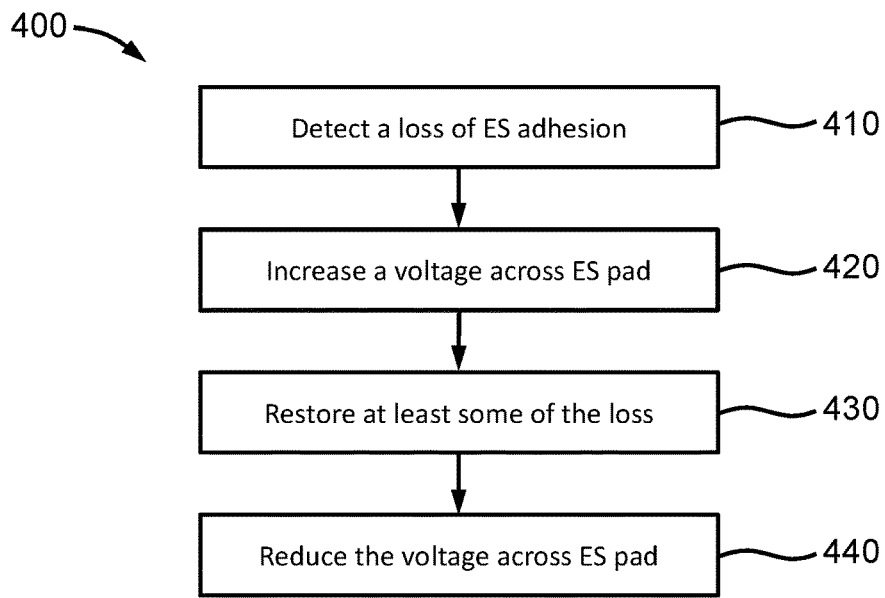
FIG. 6 is a flowchart of steps for a method of controlling electrostatic adhesion between a sheet of material and an electrostatic pad.

FIG. 6 shows a flowchart of steps for a method 400 of controlling electrostatic adhesion 10 between a sheet 20 of material 21 and an electrostatic pad 30. The method 400 includes: (i) at block 410, detecting a loss 14 of electrostatic adhesion 10 between the sheet 20 and the electrostatic pad 30; (ii) at block 420, increasing a voltage 40 across the electrostatic pad 30; and (iii) at block 430, restoring at least some 18 of the loss 14 of electrostatic adhesion 10 between the sheet 20 and the electrostatic pad 30. The method 400 may further include: (iv) at block 440, reducing the voltage 40 across the electrostatic pad 30 when at least some 18 of the loss 14 of electrostatic adhesion 10 is restored.

Figure 7:
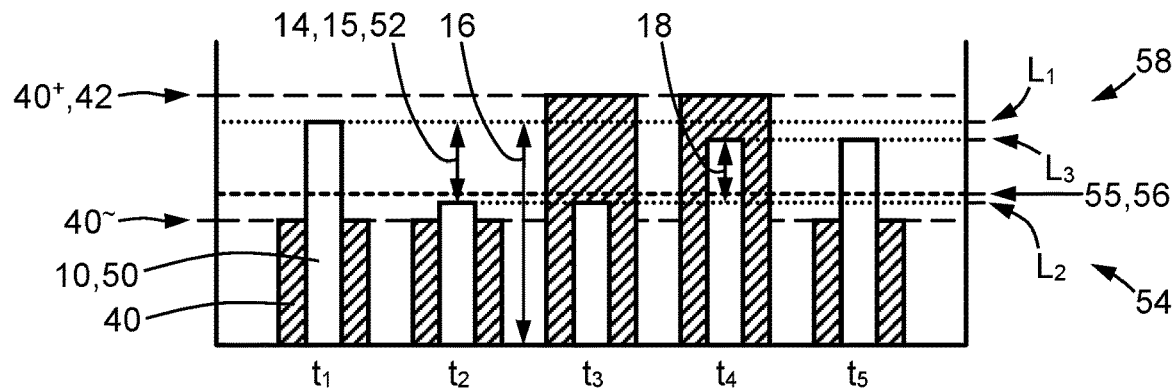
FIG. 7 is a timeline showing electrostatic adhesion, voltage and capacitance at selected timepoints.

FIG. 7 shows a timeline illustrating electrostatic adhesion 10, voltage 40 and capacitance 50 at selected timepoints. Here, the voltage 40 at each timepoint is represented by a wide cross-hatched rectangle with the voltage 40 being measured against the left vertical axis, while the electrostatic adhesion 10 and capacitance 50 at each timepoint are represented by a narrow non-cross-hatched rectangle overlaying the respective voltage 40 rectangle with the electrostatic adhesion 10 and capacitance 50 being measured against the right vertical axis.

At a first timepoint $t_1$, the voltage 40 being sent to the electrostatic pads 30 is at a baseline voltage level 40⁻, and the electrostatic adhesion 10 and capacitance 50 are at a first level $L_1$, wherein the first level $L_1$ is above or greater than the predetermined capacitance limit 55. As long as the capacitance 50 is at 56 or above 58 the predetermined capacitance limit 55, the voltage 40 may be maintained at the baseline voltage level 40⁻.

At a second timepoint $t_2$, the capacitance 50 has suffered a drop 52 from the first level $L_1$ to a second level $L_2$ which is below 54 the predetermined capacitance limit 55. This drop 52 in capacitance 50 corresponds to a loss 14 in electrostatic adhesion 10, which is less 15 than a full loss 16 of electrostatic adhesion 10.

At a third timepoint $t_3$, and because of the drop 52 and loss 14 detected at the second timepoint $t_2$, the voltage 40 is increased to an elevated voltage level $40^+$, which may be approximately double 42 the baseline voltage level $40^-$.

At a fourth timepoint $t_4$, and because of the increase in voltage 40 commenced at the third timepoint $t_3$, the capacitance 50 and electrostatic adhesion 10 have increased to a third level $L_3$ which is above 58 the predetermined capacitance limit 55. This increase in capacitance 50 and electrostatic adhesion 10 from the second level $L_2$ to the third level $L_3$ restores at least some 18 of the loss 14 of electrostatic adhesion 10 that was detected at the second timepoint $t_2$. Note that the second level $L_2$ to which the capacitance 50 and electrostatic adhesion 10 have been restored is illustrated as being less than the first level $L_1$; however, the capacitance 50 and electrostatic adhesion 10 may also be raised to the first level $L_1$ or even higher, as long as the capacitance 50 and electrostatic adhesion 10 are raised to at 56 or above 58 the predetermined capacitance limit 55.

At a fifth timepoint $t_5$, and because of the increase in capacitance 50 and electrostatic adhesion 10 caused at the fourth timepoint $t_4$, the voltage 40 may be lowered back to the baseline voltage level $40^-$. Note that the duration of the timepoints shown are not necessarily drawn to scale and may be the same as or different from each other. Also, these timepoints may also represent respective spans of time instead of or in addition to discrete points in time.

Figure 8:
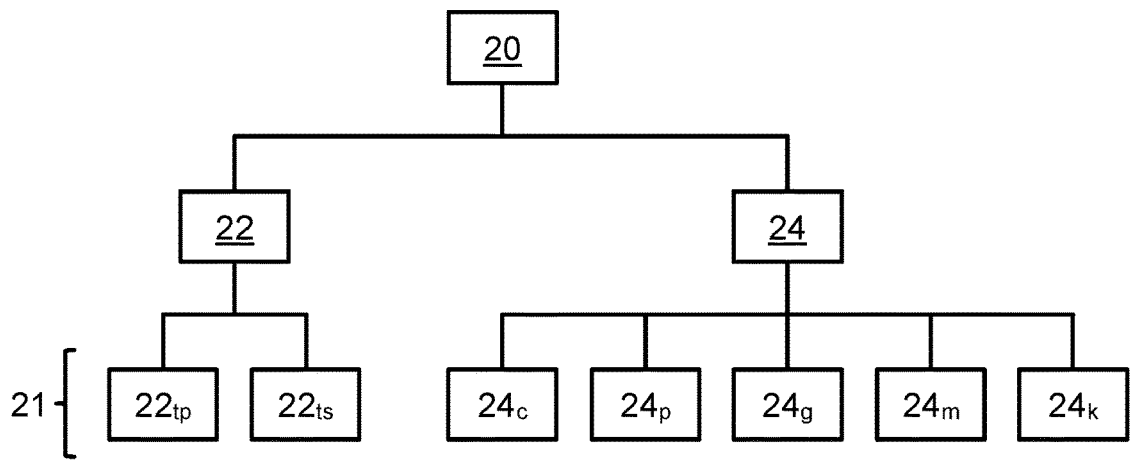
FIG. 8 is a block diagram of exemplary materials out of which the sheet may be constructed.

FIG. 8 shows a block diagram of exemplary components of which the sheet 20 of material 21 may be constructed. As shown here, a sheet 20 may include a fiber core 24 covered by at least one veil 22, which together form the material 21 of which the sheet 20 is made. The fiber core 24 may be made of a multiplicity of fibers or strands, which may be woven together (e.g., in the form of a cloth or textile) or which may take the form of a mat of chopped fiber or strands. The fibers or strands of the fiber core 24 may be made of one or more of carbon $24_c$ (e.g., carbon fiber), polymer $24_p$ (e.g., polyester, polyamide, polyethylene terephthalate, aramid, acrylic), glass $24_g$ (e.g., fiberglass), metal $24_m$ (e.g., stainless steel, nickel, aluminum, titanium, copper) and ceramic $24_k$ (e.g., silica, alumina, basalt). The veil 22 may be made of a thermoplastic material $22_{tp}$ (which may be melted by the application of heat and then allowed to return to solid form by cooling) or a thermoset material $22_{ts}$ (which may be chemically activated and cured by the application of heat).

As one having skill in the relevant art will appreciate, the system 300 and method 100 of the present disclosure may be presented or arranged in a variety of different configurations and embodiments.

According to one embodiment, a method 100 for managing electrostatic adhesion 10 between a sheet 20 of material 21 and an electrostatic pad 30 includes: (i) at blocks 110 and 120, applying a voltage 40 across the electrostatic pad 30 to establish a baseline voltage level $40^-$ thereacross and to generate an electrostatic potential 45 across the electrostatic pad 30; (ii) at blocks 130 and 140, bringing the electrostatic pad 30 near 26 or into contact 28 with the sheet 20 so that the sheet 20 electrostatically adheres 12 to the electrostatic pad 30; and (iii) at block 150, monitoring a capacitance 50 between the sheet 20 and the electrostatic pad 30. The method 100 may also include: at block 180, lifting the electrostatic pad 30, thereby also lifting the sheet 20 which is electrostatically adhered 12 thereto; and at block 190, if a drop 52 in the capacitance 50 occurs that is below a predetermined capacitance limit 55, then, at block 200, increasing the voltage 40 to an elevated voltage level $40^+$ so as to increase the electrostatic adhesion 10 between the electrostatic pad 30 and the sheet 20.

In this embodiment, the drop 52 in the capacitance 50 below the predetermined capacitance limit 55 may be indicative of a loss 14 of electrostatic adhesion 10 between the sheet 20 and the electrostatic pad 30. Here, the increasing the voltage 40 may restore at least some 18 of the loss 14 of electrostatic adhesion 10 between the sheet 20 and the electrostatic pad 30, such as by restoring some or all of the lost or reduced electrostatic adhesion 10. This increasing the voltage 40 may restore the capacitance 50 to at 56 or above 58 the predetermined capacitance limit 55, and the loss 14 may be less than a full loss 16 of electrostatic adhesion 10 between the sheet 20 and the electrostatic pad 30.

The method 100 may also include: at block 210, continuing to monitor the capacitance 50 between the sheet 20 and the electrostatic pad 30, and, at block 220, if the capacitance 50 rises to at 56 or above 58 the predetermined capacitance limit 55, then, at block 230, decreasing the voltage 40 to the baseline voltage level $40^-$. Here, the elevated voltage level $40^+$ may be approximately double 42 the baseline voltage level $40^-$.

The sheet 20 may electrostatically adhere 12 to the electrostatic pad 30 due to the electrostatic adhesion 10 generated by the electrostatic potential 45. The sheet 20 of material 21 may have a fiber core 24 made of at least one of carbon $24_c$, polymer $24_p$, glass $24_g$, metal $24_m$ and ceramic $24_k$, and the capacitance 50 between the sheet 20 and the electrostatic pad 30 may be inferred from a power curve 60 associated with applying the voltage 40 to the electrostatic pad 30.

The method 100 may further include, at block 160, monitoring a power curve 60 associated with the increasing the voltage 40 when the capacitance 50 is below the predetermined capacitance limit 55, and, at block 170, inferring the capacitance 50 between the sheet 20 and the electrostatic pad 30 from the power curve 60. The voltage 40 applied to the electrostatic pad 30 may be applied as an AC square wave 70 having a rise time 92, and the capacitance 50 between the sheet 20 and the electrostatic pad 30 may be inferred from the rise time 92.

According to another embodiment, a method 100 for controlling electrostatic adhesion 10 between a sheet 20 of material 21 and an electrostatic pad 30 includes: at block 130, placing the electrostatic pad 30 near 26 or in contact 28 with the sheet 20 so that, at block 140, the sheet 20 electrostatically adheres 12 to the electrostatic pad 30; and, at block 150, monitoring a capacitance 50 between the sheet 20 and the electrostatic pad 30.

The method 100 may also include, at block 110, applying a voltage 40 across the electrostatic pad 30 to establish a baseline voltage level $40^-$ thereacross, and, at block 120, generating an electrostatic potential 45 across the electrostatic pad 30 as a result of the voltage 40 applied across the electrostatic pad 30. The method 100 may additionally include, at block 180, moving the electrostatic pad 30, and thereby moving the sheet 20 that is electrostatically adhered 12 to the electrostatic pad 30, and may further include, at block 200, increasing the voltage 40 to an elevated voltage level $40^+$ if the capacitance 50 drops below a predetermined capacitance limit 55.

In this embodiment, a drop 52 in the capacitance 50 below the predetermined capacitance limit 55 may be indicative of a loss 14 of electrostatic adhesion 10 between the sheet 20 and the electrostatic pad 30 which is less than a full loss 16 of electrostatic adhesion 10 between the sheet 20 and the electrostatic pad 30, and the increasing the voltage 40 may restore at least some 18 of the loss 14 of electrostatic adhesion 10 between the sheet 20 and the electrostatic pad 30. The sheet 20 of material 21 may have a fiber core 24 made of at least one of carbon $24_c$, polymer $24_p$, glass $24_g$, metal $24_m$ and ceramic $24_k$, and the sheet 20 may electrostatically adhere 12 to the electrostatic pad 30 due to the electrostatic adhesion 10 generated by the electrostatic potential 45.

The method 100 may also include: at block 210, continuing to monitor the capacitance 50 between the sheet 20 and the electrostatic pad 30; and at block 220, if the capacitance 50 rises to at 56 or above 58 the predetermined capacitance limit 55, then, at block 230, decreasing the voltage 40 to the baseline voltage level 40⁻. The method 100 may further include: at block 160, monitoring a power curve 60 associated with the increasing the voltage 40 when the capacitance 50 is below the predetermined capacitance limit 55; and at block 170, inferring the capacitance 50 between the sheet 20 and the electrostatic pad 30 from the power curve 60. The voltage 40 applied to the electrostatic pad 30 may be applied as an AC square wave 70 having a rise time 92, and the capacitance 50 between the sheet 20 and the electrostatic pad 30 may be inferred from the rise time 92.

According to yet another embodiment, a system 300 for managing electrostatic adhesion 10 between a sheet 20 of material 21 and an electrostatic pad 30 includes: (i) a voltage module 310 configured for applying a voltage 40 across the electrostatic pad 30, to thereby establish a baseline voltage level 40⁻ and to generate an electrostatic potential 45 across the electrostatic pad 30; (ii) a monitoring module 330 configured for monitoring a capacitance 50 between the sheet 20 and the electrostatic pad 30; and (iii) a control module 340 operatively connected with at least the voltage module 310 and the monitoring module 330.

The sheet 20 of material 21 may have a fiber core 24 made of at least one of carbon $24_c$, polymer $24_p$, glass $24_g$, metal $24_m$ and ceramic $24_k$, and the system 300 may also include a moving module 320 configured for moving the electrostatic pad 30 to a first position 91 near 26 the sheet 20 and to one or more other positions 93 away from the first position 91. If the capacitance 50 drops below a predetermined capacitance limit 55, then at least one of the monitoring module 330 and the control module 340 may cause the voltage module 310 to increase the voltage 40 to an elevated voltage level 40⁺ so as to increase the electrostatic adhesion 10 between the electrostatic pad 30 and the sheet 20.

The monitoring module 330 may be configured to continue monitoring the capacitance 50 between the sheet 20 and the electrostatic pad 30 after the voltage 40 has been increased to the elevated voltage level 40⁺, and at least one of the monitoring module 330 and the control module 340 may be configured to cause the voltage module 310 to decrease the voltage 40 to the baseline voltage level 40⁻ if the capacitance 50 rises to at 56 or above 58 the predetermined capacitance limit 55.

In this system 300, at least one of the monitoring module 330 and the control module 340 may be configured to monitor a power curve 60 associated with the increase in voltage 40 when the capacitance 50 is below the predetermined capacitance limit 55, and to infer the capacitance 50 between the sheet 20 and the electrostatic pad 30 from the power curve 60. Additionally, the voltage module 310 may be configured to apply the voltage 40 to the electrostatic pad 30 as AC square wave 70 having a rise time 92, wherein at least one of the monitoring module 330 and the control module 340 is configured to infer the capacitance 50 between the sheet 20 and the electrostatic pad 30 from the rise time 92.

According to a further embodiment, a method 400 for controlling electrostatic adhesion 10 between a sheet 20 of material 21 and an electrostatic pad 30 includes: (i) at block 410, detecting a loss 14 of electrostatic adhesion 10 between the sheet 20 and the electrostatic pad 30; (ii) at block 420, increasing a voltage 40 across the electrostatic pad 30; and (iii) at block 430, restoring at least some 18 of the loss 14 of electrostatic adhesion 10 between the sheet 20 and the electrostatic pad 30. The method 400 may further include: (iv) at block 440, reducing the voltage 40 across the electrostatic pad 30 when at least some 18 of the loss 14 of electrostatic adhesion 10 is restored.

While various steps of the method 100 have been described as being separate blocks, and various functions of the system 300 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

(As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method for managing electrostatic adhesion between a sheet of material and an electrostatic pad, comprising:
    applying a voltage across the electrostatic pad to establish a baseline voltage level thereacross and to generate an electrostatic potential across the electrostatic pad;
    bringing the electrostatic pad near or into contact with the sheet so that the sheet electrostatically adheres to the electrostatic pad;
    monitoring a capacitance between the sheet and the electrostatic pad; and
    if a drop in the capacitance occurs that is below a predetermined capacitance limit, then increasing the voltage to an elevated voltage level so as to increase the electrostatic adhesion between the electrostatic pad and the sheet.

2. The method of claim 1, further comprising:
    lifting the electrostatic pad, thereby also lifting the sheet which is electrostatically adhered thereto.

3. The method of claim 1, wherein the drop in the capacitance below the predetermined capacitance limit is indicative of a loss of electrostatic adhesion between the sheet and the electrostatic pad.

4. The method of claim 3, wherein the increasing the voltage restores at least some of the loss of electrostatic adhesion between the sheet and the electrostatic pad.

5. The method of claim 3, wherein the increasing the voltage restores the capacitance to at or above the predetermined capacitance limit.

6. The method of claim 3, wherein the loss is less than a full loss of electrostatic adhesion between the sheet and the electrostatic pad.

7. The method of claim 1, wherein the sheet electrostatically adheres to the electrostatic pad due to the electrostatic adhesion generated by the electrostatic potential.

8. The method of claim 1, further comprising:
    continuing to monitor the capacitance between the sheet and the electrostatic pad; and if the capacitance rises to at or above the predetermined capacitance limit, then decreasing the voltage to the baseline voltage level.

9. The method of claim 1, wherein the elevated voltage level is approximately double the baseline voltage level.

10. The method of claim 1, wherein the capacitance between the sheet and the electrostatic pad is inferred from a power curve associated with applying the voltage to the electrostatic pad.

11. The method of claim 1, further comprising:
    monitoring a power curve associated with the increasing the voltage when the capacitance is below the predetermined capacitance limit; and
    inferring the capacitance between the sheet and the electrostatic pad from the power curve.

12. The method of claim 1, wherein the voltage applied to the electrostatic pad is applied as an AC square wave having a rise time, and wherein the capacitance between the sheet and the electrostatic pad is inferred from the rise time.

13. The method of claim 1, wherein the sheet of material has a fiber core made of at least one of carbon, polymer, glass, metal and ceramic.

14. A method for controlling electrostatic adhesion between a sheet of material and an electrostatic pad, comprising:
    placing the electrostatic pad near or in contact with the sheet so that the sheet electrostatically adheres to the electrostatic pad;
    monitoring a capacitance between the sheet and the electrostatic pad;
    applying a voltage across the electrostatic pad to establish a baseline voltage level thereacross; and
    increasing the voltage to an elevated voltage level if the capacitance drops below a predetermined capacitance limit.

15. The method of claim 14, further comprising: generating an electrostatic potential across the electrostatic pad as a result of the voltage applied across the electrostatic pad.

16. The method of claim 14, further comprising:
    moving the electrostatic pad, and thereby moving the sheet that is electrostatically adhered to the electrostatic pad.

17. The method of claim 14, wherein a drop in the capacitance below the predetermined capacitance limit is indicative of a loss of electrostatic adhesion between the sheet and the electrostatic pad which is less than a full loss of electrostatic adhesion between the sheet and the electrostatic pad, and wherein the increasing the voltage restores at least some of the loss of electrostatic adhesion between the sheet and the electrostatic pad.

18. The method of claim 15, wherein the sheet electrostatically adheres to the electrostatic pad due to the electrostatic adhesion generated by the electrostatic potential.

19. The method of claim 14, further comprising:
    continuing to monitor the capacitance between the sheet and the electrostatic pad; and
    if the capacitance rises to at or above the predetermined capacitance limit, then decreasing the voltage to the baseline voltage level.

20. The method of claim 14, further comprising:
    monitoring a power curve associated with the increasing the voltage when the capacitance is below the predetermined capacitance limit; and
    inferring the capacitance between the sheet and the electrostatic pad from the power curve.

21. The method of claim 14, wherein the voltage applied to the electrostatic pad is applied as an AC square wave having a rise time, and wherein the capacitance between the sheet and the electrostatic pad is inferred from the rise time.

22. The method of claim 14, wherein the sheet of material has a fiber core made of at least one of carbon, polymer, glass, metal and ceramic.

23. A system for managing electrostatic adhesion between a sheet of material and an electrostatic pad, comprising:
    a voltage module configured for applying a voltage across the electrostatic pad, to thereby establish a baseline voltage level thereacross and to generate an electrostatic potential across the electrostatic pad;
    a monitoring module configured for monitoring a capacitance between the sheet and the electrostatic pad; and
    a control module operatively connected with at least the voltage module and the monitoring module,
    wherein if the capacitance drops below a predetermined capacitance limit, then at least one of the monitoring module and the control module causes the voltage module to increase the voltage to an elevated voltage level so as to increase the electrostatic adhesion between the electrostatic pad and the sheet.

24. The system of claim 23, further comprising:
a moving module configured for moving the electrostatic pad to a first position near the sheet and to one or more other positions away from the first position.

25. The system of claim 23, wherein the monitoring module is configured to continue monitoring the capacitance between the sheet and the electrostatic pad after the voltage has been increased to the elevated voltage level, and at least one of the monitoring module and the control module is configured to cause the voltage module to decrease the voltage to the baseline voltage level if the capacitance rises to at or above the predetermined capacitance limit.

26. The system of claim 23, wherein at least one of the monitoring module and the control module is configured to monitor a power curve associated with the increase in voltage when the capacitance is below the predetermined capacitance limit, and to infer the capacitance between the sheet and the electrostatic pad from the power curve.

27. The system of claim 23, wherein the voltage module is configured to apply the voltage to the electrostatic pad as an AC square wave having a rise time, and wherein at least one of the monitoring module and the control module is configured to infer the capacitance between the sheet and the electrostatic pad from the rise time.

28. The system of claim 23, wherein the sheet of material has a fiber core made of at least one of carbon, polymer, glass, metal and ceramic.

29. A method for controlling electrostatic adhesion between a sheet of material and an electrostatic pad, comprising:
detecting a loss of electrostatic adhesion between the sheet and the electrostatic pad by monitoring a capacitance between the sheet and the electrostatic pad and by detecting a drop in the capacitance below a predetermined capacitance limit;
increasing a voltage across the electrostatic pad; and
restoring at least some of the loss of electrostatic adhesion between the sheet and the electrostatic pad.

30. The method of claim 29, further comprising:
reducing the voltage across the electrostatic pad when at least some of the loss of electrostatic adhesion is restored.

* * * * *